United States Patent

[11] 3,602,261

| [72] | Inventors | Robert O. Brown<br>Media;<br>Edwin G. Noyes, Jr., Newtown Square;<br>Joseph D. Conrad, Jr., Glen Mills, all of, Pa. |
|---|---|---|
| [21] | Appl. No. | 811,007 |
| [22] | Filed | Mar. 27, 1969 |
| [45] | Patented | Aug. 31, 1971 |
| [73] | Assignee | Westinghouse Electric Corporation<br>Pittsburgh, Pa. |

[54] STREAM TURBINE CONTROL VALVE STRUCTURE
1 Claim, 5 Drawing Figs.

[52] U.S. Cl. ............................................. 137/625.3,
137/625.37, 137/614.16
[51] Int. Cl. ..................................................... F15d 1/00,
F16k 47/14
[50] Field of Search........................................137/625.33,
625.37, 625.38, 625.3, 614.16

[56] References Cited
UNITED STATES PATENTS

| 951,267 | 3/1910 | Cator | 251/210 X |
|---|---|---|---|
| 1,111,244 | 9/1914 | Wilson | 137/625.37 X |
| 1,668,128 | 5/1928 | Ruths | 137/625.37 |

FOREIGN PATENTS

| 623,772 | 1927 | France | 137/625.31 |
|---|---|---|---|
| 278,451 | 1927 | Great Britain | 137/625.3 |

*Primary Examiner*—Arnold Rosenthal
*Attorneys*—A. T. Stratton, F. P. Lyle and F. Cristiano, Jr.

ABSTRACT: The invention provides novel valve structure for controlling the supply of hot pressurized steam to a steam turbine with a minimum of noise and vibration, especially in the partially open position where a large degree of throttling is attained. Tubular structure having a large number of perforations that are progressively uncovered as the valve plug is moved in opening direction is provided, thereby imposing a large number of small throttlings in the steam flow (instead of the usual single large throttling) with attendant reduction in noise and vibration level over the entire operating range of the valve.

INVENTORS
Robert O. Brown, Edwin G. Noyes, Jr.
and Joseph D. Conrad, Jr.
BY
Frank Cutaia Jr

STREAM TURBINE CONTROL VALVE STRUCTURE

BACKGROUND OF THE INVENTION

As the size of steam turbines has grown, the size of the throttling valves has also increased in order to handle the large volumetric flow of steam into the turbine. These valves, in operation, control the steam flow to the turbine over a wide operational range from fully open to fully closed and, as a result, must operate over a wide pressure drop range for example from 100 percent to about 2 percent. It is desirable that valves of this type operate successfully at very high pressure drop value (closed or almost closed) and also be highly efficient at low pressure drop valves (wide or almost wide open).

Operating experience has shown that large steam throttling valves, as presently employed to control steam flow to turbines, create extremely high levels of noise and vibration, especially when the pressure drop across the valve is critical, i.e. on the order of 50 percent or greater. These vibrations are of such severity that they can cause failure of the equipment, and the noise intensity is so great that it can be injurious to human hearing and health.

Accordingly, one of the main objects of this invention is to provide a throttling valve for controlling system flow to a turbine with reduced noise and vibration over its entire operating range and which is highly efficient when fully open.

BRIEF SUMMARY OF THE INVENTION

The present invention provides a control valve for a steam turbine of the type above, in which high-pressure steam is controlled by an axially movable valve plug at any rate desired up to the maximum rated capability of the turbine, in order to control the turbine loading. Two embodiments of the invention are described and, in both embodiments, a plurality of small steam throttling passages are provided which are progressively uncovered as the valve plug is moved in opening direction, thereby to divide the steam flow into an increasing number of discrete steam flows. Each passage provides individual throttling of the steam from high pressure to a selected lower pressure before admission to the turbine and the plurality of individual throttlings are effective to minimize the generation of objectionable vibration and noise.

The throttling passages are arranged to be entirely uncovered before the valve plug is moved to the wide open position, so that the full flow operating efficiency of the valve is not impaired. Preferably, though not essentially, the throttling passages are arranged to be entirely uncovered when the pressure drop across the valve falls below "critical," i.e. when $(P_I - P_O/P_I)$ is less than 0.5, where $P_I$ = valve inlet steam pressure
$P_O$ = valve outlet steam pressure.

In the first embodiment, the valve plug is encompassed by a tubular steam strainer structure which has an annular end portion adjacent the valve port provided with a plurality of throttling passages disposed in slidable abutment with the valve plug and the remaining portion with a large number of steam straining passages to permit steam flow therethrough with minimal pressure drop.

In the second embodiment, the axially slidable valve plug is provided with an inner cup-shaped sleeve member and an outer tubular sleeve disposed in axially slidable relation with each other. One of the sleeve members, for example, the inner sleeve is movable into abutting relation with the valve port to block all steam flow therethrough, and is further provided with the throttling passages.

The other sleeve member, in this case the outer sleeve, has a tubular imperforate portion abutting and blocking the throttling passages when the inner sleeve is in the closed position (abutting the valve port).

As the valve plug structure is moved in opening direction, the outer sleeve member is initially moved in axial direction, thereby progressively uncovering the throttling passages. When all of the throttling passages are uncovered, opening of the inner sleeve member is initiated to permit unrestricted greater flow through the valve until the valve is moved to its fully open position.

THE DRAWINGS

The invention, along with the objects and advantages thereof, will become more apparent from the following detailed description read in conjunction with the accompanying drawings, in which.

FIRST EMBODIMENT

Figure 1:
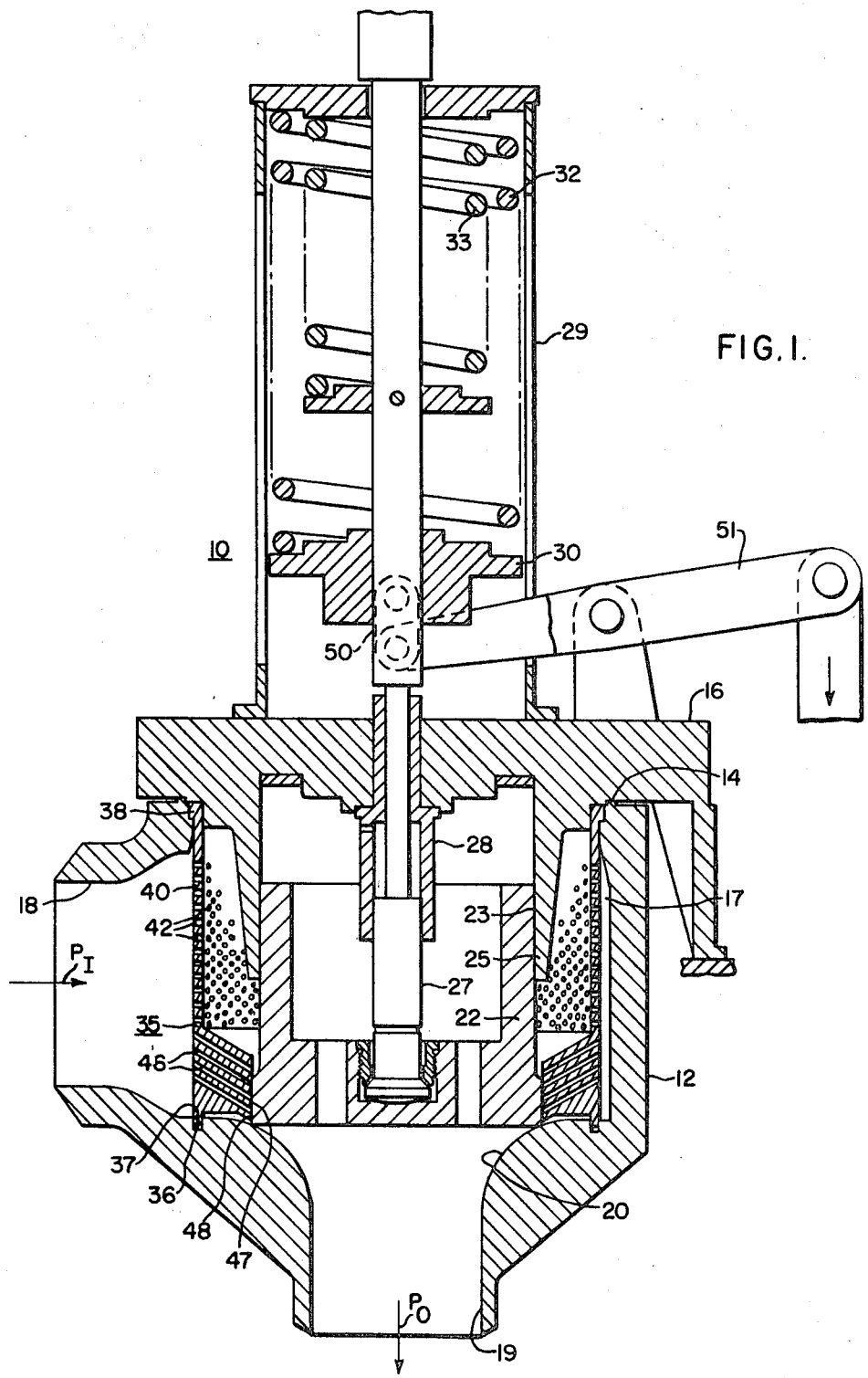
FIG. 1 is an axial sectional view of a control valve embodiment in accordance with the invention, the valve being shown in the fully closed position.
Figure 2:
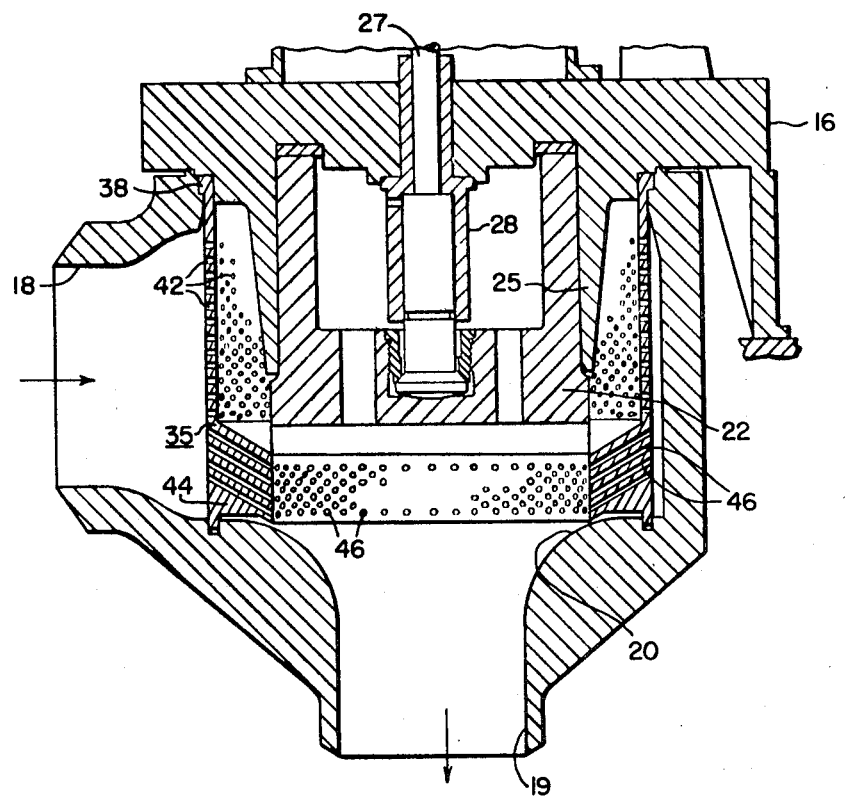
FIG. 2 is a view similar to FIG. 1, but with the valve in an open position.

Referring to the drawings in detail and especially FIGS. 1 and 2, there is shown a valve structure, generally designated 10, constructed in accordance with one aspect of the invention. The valve structure includes a tubular or cup-shaped valve body 12 having an open end or seal portion 14 cooperatively associated with an upper closure or end wall member 16 to form a main valve chamber 17. The body member 12 is provided with inlet and outlet passages 18 and 19, respectively, communicating with the valve chamber. As illustrated, the inlet and outlet passages are disposed substantially at right angles to each other, though the invention is not limited thereto.

The outlet passageway 19 is provided with a smoothly rounded valve port 20 of annular shape formed in axial alignment with a concentrically positioned movable valve plug structure 22 disposed in the valve chamber 17. The valve plug 22 is cup-shaped and is slidably received in a bore 23 formed by a depending tubular valve guide 25, which guide may be integrally formed with the end closure wall 16.

The valve plug 22 may be operatively controlled or positioned in any suitable manner. However, as illustrated, the valve 10 is of the type biased to the closed or fluid flow blocking position as shown in FIG. 1 wherein the plug 22 is in abutment with the valve port 20, and movable in axial direction to unblock the latter, as shown in FIG. 2.

The valve plug structure 22 is connected to an axially elongated actuating rod 27 extending through a tubular bushing 28 disposed in the end wall 16. The rod 27 extends into a tubular shell structure 29 attached to the end wall 16 in any suitable manner and is provided with a bushing 30 acting as an abutment for a pair of helical compression springs 32 and 33 disposed within the shell.

The actuating rod 27 is further pivotally attached to a lever system including a lever 50 and a lever 51, the lever 51 extending through the shell 29 and being pivotally mounted on a fulcrum member 54, which in turn is rigidly fixed to the end wall 16.

The lever 51 is connected to any suitable actuator device, for example a hydraulic servomotor (not shown) as well known in the art.

As thus far described, the valve structure is substantially conventional.

In accordance with the invention, a tubular structure 35 is disposed in the valve chamber 17 in encompassing relation with the valve plug 22. The tubular structure 35 has its lower annular end portion 36 disposed in a mating annular recess 37 provided in the valve body 12 and its upper annular end portion 38 disposed in abutment with the end wall 16.

The tubular structure 35 is foraminous and is formed with a relatively thin wall upper portion 40 having a large number of small perforations 42 effective as steam strainers and a relatively thick wall lower portion 44 having a plurality of annular rows of steam throttling passages 46. The thick lower portion of the structure 35 extends radially inwardly and has a cylindrical inner surface 47 disposed in slidable sealing abutment with the outer surface 48 of the plug 22, while the thin upper portion 40 is disposed in radially spaced relation with the plug 22.

In operation, as the valve plug 22 is moved in opening direction by axial upward movement of the rod 27, the throttling passages 46 are initially progressively uncovered, so that a progressively greater flow of steam is directed to the outlet 19 past the unblocked valve port 20. During such partially open position all of the steam flow must flow through the throttling passages 46, thereby dividing the steam flow into a number of discrete flow passages. Each of the thus uncovered throttling passages provides individual throttling of the steam from the high inlet pressure value to a selected lower pressure for motivating the steam turbine (not shown). The plurality of individual throttlings are effective to minimize the formation of objectionable noise and vibration.

The throttling passages 46 are so arranged on the thick wall portion 44 of the structure 35, that they are not all uncovered until the pressure drop across the valve falls below "critical," i.e. when $(P_I-P_O/P_O)$ is less than 0.5 where $P_I$ = Steam pressure at the valve inlet 18.
$P_O$ = Steam pressure at the valve outlet 19.

As the plug 22 is moved upwardly beyond the extent of the throttling passages, as indicated in FIG. 2, all of the strainer perforations 42 are concomitantly placed in communication with the valve port 20 through the annular clearance space 50 between the plug 22 and the wall portion 44 of the tubular structure 35, so that for pressure drop values less than 0.5, minimal pressure drop losses across the tubular structure 35 are attained.

SECOND EMBODIMENT

Figure 3:
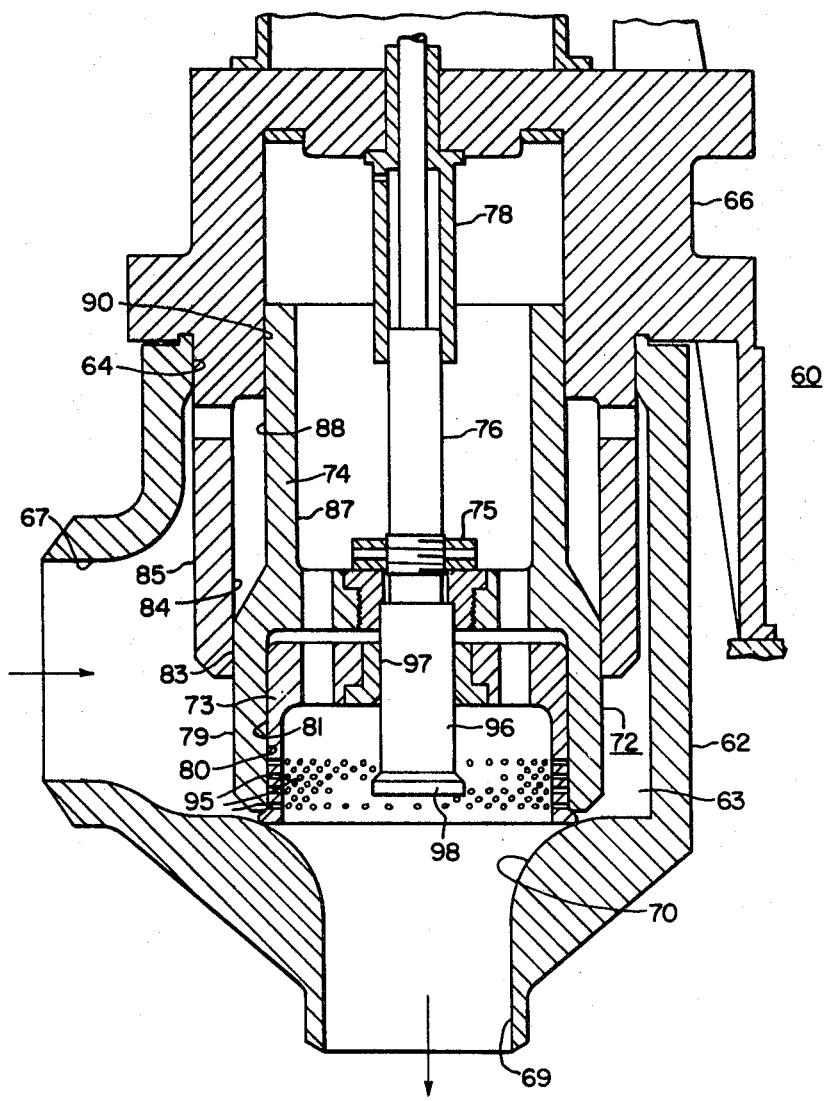
FIG. 3 is an axial sectional view of a second embodiment of the invention; the valve being shown in the closed position.
Figure 5:
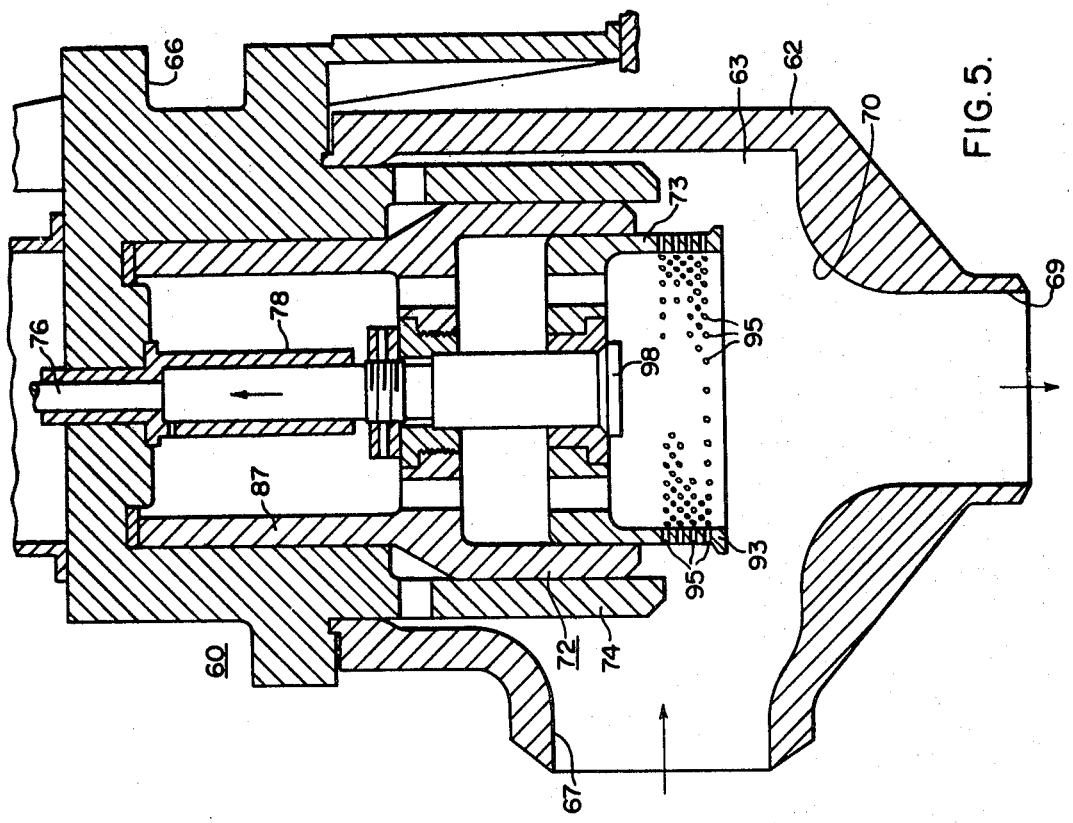
FIG. 5 is a view similar to FIG. 4, but with the valve in the fully open position.
Figure 4:
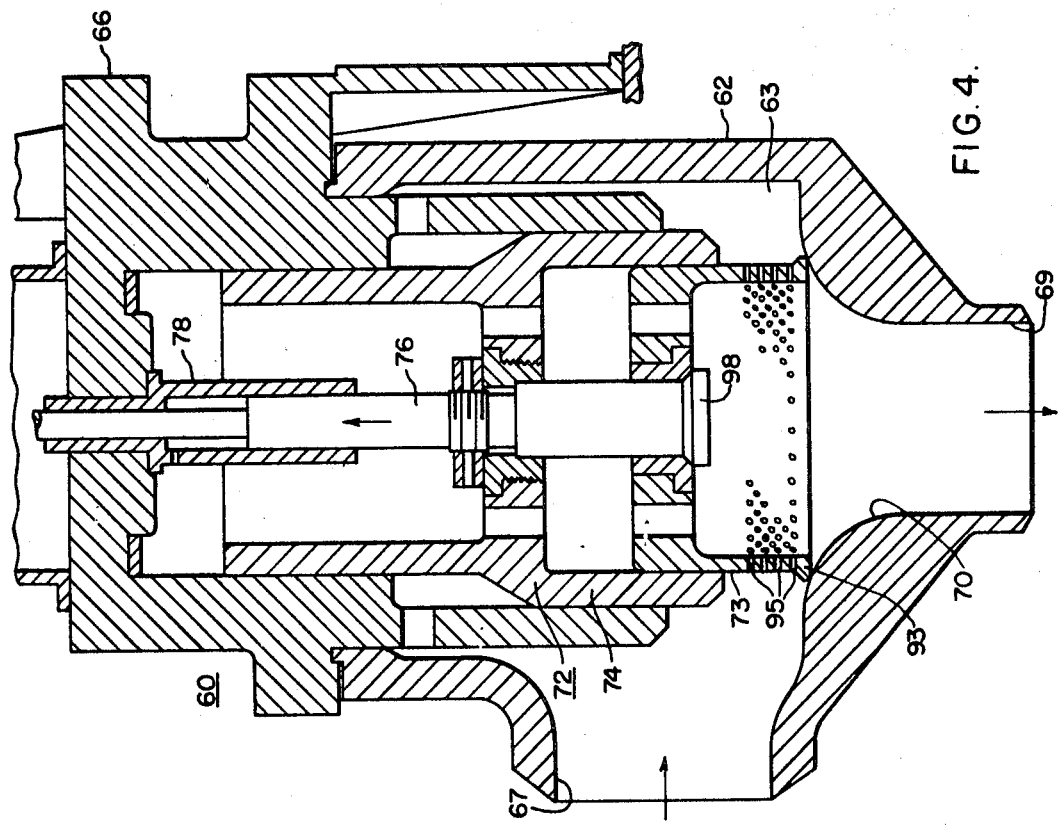
FIG. 4 is a view similar to FIG. 3, but with the valve in a partially open position.

In FIGS. 3, 4 and 5 there is shown a valve 60 forming another embodiment of the invention. In these views, the upper portion of the valve has not been shown, since it may be similar to the structure shown in FIG. 1, in connection with the first embodiment.

The valve 60 is of the same type as that previously described and comprises a tubular valve body 62 having a chamber 63 and an annular opening 64 at its upper end closed by an end wall closure structure 66. The body is further provided with a steam inlet 67 for directing steam into the chamber 63 and a steam outlet 69 for delivering steam from the chamber 63 to a steam turbine (not shown). Also, as in the first embodiment, an annular smoothly curved valve port 70 is provided for directing the steam from the chamber 63 to the outlet 69, and flow past the valve port 70 is controlled by an axially movable valve plug structure 72.

The plug structure 72 comprises an inverted inner cup-shaped sleeve member 73 and an outer cylindrical sleeve member 74 disposed in telescopic relation with the inner member. The outer sleeve member is firmly connected by a suitable locking means 75 to an axially disposed actuating rod member 76, and the rod member is slidably received in a bushing 78 carried by the closure member 66. The outer sleeve member 74, in the example, is provided with an enlarged lower cylindrical portion 79 having an inner cylindrical wall surface 80 disposed in slidable relation with the outer cylindrical wall surface 81 of the inner sleeve member, and an outer wall surface 83 disposed in axially slidable relation with the inner surface 84 of a tubular guide member 85. The tubular guide member 85 is preferably, though not essentially, integrally connected to the end closure 66.

For further slidable support, the outer sleeve member 74 is provided with an upper cylindrical portion 87 having an outer wall surface 88 of reduced diameter and disposed in axially slidable relation with the wall 90 of a cylindrical bore 91 formed in the closure member 66.

The inner cup member 73 is disposed in inverted relation with the outer sleeve 74 and is provided with a cylindrical wall portion 92 having its peripheral lower edge portion 93 disposed in registry with the valve port 70 and effective when disposed in abutment therewith, as shown in FIG. 3, to block steam flow therepast.

The wall portion 92 of the inner member 73 is provided with a large number of steam throttling passages 95 extending therethrough. These passages are blocked by the wall portion 79 of the outer sleeve 74 when the valve is in the fully closed position (FIG. 3).

The actuating rod member 76 has a lower end portion 96 that slidably extends through an opening 97 a predetermined extent and has an annular flange 98 at its end to hold captive the cup member.

To actuate the valve 60 to an open position, the actuator rod 76 is axially translated upwardly (as described in connection with the first embodiment), thereby translating the outer sleeve 74 of the plug structure in upward direction. During such initial movement (as seen in Fig. 4) the inner cup member 73 remains in seated relation with the valve port 70. Accordingly, the throttling passages 95 are progressively uncovered to permit an increasing flow of steam to flow through the thus partially open valve. However, at this stage, all of the steam flow is directed through the throttling passages 95 in a great number of discrete small flows, thereby minimizing noise and vibration during high-pressure drop operation of the valve.

As the valve is moved to its fully open position, as seen in FIG. 5, by further translation of the rod 76, the flange 98 thereon is brought to bear against the cup member 72, and the cup member is lifted from the valve port 70 to provide a clear and unobstructed passage for the steam flow at the higher flow rates.

Although two embodiments of the invention have been shown, it will be obvious to those skilled in the art that the invention is not so limited, but is susceptible to various other changes without departing from the spirit thereof.

We claim:
1. A valve for controlling high-pressure steam flow to a steam turbine, comprising
    a valve body having an annular valve port disposed therein,
    means defining a steam inlet and a steam outlet disposed in steam flow communication with said port,
    a valve plug structure disposed for axially slidable movement into and out of steam flow blocking relation with said valve port,
    a tubular foraminous steam strainer disposed in encompassing relation with the valve plug structure,
    said strainer having an annular end portion disposed in slidable abutment with the valve plug structure,
    said strainer providing a plurality of small steam throttling passages interposed between said steam inlet and said valve port,
    the throttling passages being disposed in said strainer end portion, and
    said steam strainer having another annular portion adjacent to the end portion provided with apertures of sufficient size and number to strain and permit steam flow therethrough with minimal pressure drop, and disposed in spaced relation to the valve plug.